United States Patent
Yamamoto et al.

(10) Patent No.: US 6,809,446 B2
(45) Date of Patent: Oct. 26, 2004

(54) YOKE HOUSING AND MOTOR

(75) Inventors: Toshio Yamamoto, Shizuoka-ken (JP);
Tomoyuki Kikuta, Aichi-ken (JP);
Masahiko Komoda, Aichi-ken (JP);
Masayuki Kuwano, Shizuoka-ken (JP);
Hideki Toida, Shizuoka-ken (JP);
Keiichi Uemura, Aichi-ken (JP)

(73) Assignee: Asmo Co., Ltd., Kosai (JP)

( * ) Notice: Subject to any disclaimer, the term of this patent is extended or adjusted under 35 U.S.C. 154(b) by 0 days.

(21) Appl. No.: 10/402,666

(22) Filed: Mar. 28, 2003

(65) Prior Publication Data
US 2004/0135446 A1 Jul. 15, 2004

(30) Foreign Application Priority Data

Mar. 28, 2002 (JP) ........................................ 2002-091142

(51) Int. Cl.⁷ ................................................ H02K 5/00
(52) U.S. Cl. ........................................................ 310/89
(58) Field of Search ........................ 310/89, 91, 42–44, 310/254

(56) References Cited

U.S. PATENT DOCUMENTS

| 5,175,460 A | 12/1992 | Ishizuka |
| 5,294,497 A | * 3/1994 | Muramatsu et al. .......... 429/97 |
| 2002/0047381 A1 | 4/2002 | Katsuhiko et al. |

FOREIGN PATENT DOCUMENTS

| EP | 1 154 541 A1 | 11/2001 | |
| JP | 2000176430 A | * 6/2000 | ............. B09B/5/00 |

* cited by examiner

*Primary Examiner*—Thanh Lam
(74) *Attorney, Agent, or Firm*—Colin P. Cahoon; Carstens, Yee & Cahoon, L.L.P.

(57) ABSTRACT

A yoke housing accommodates an armature having a coil and has a tubular circumferential wall. The yoke housing includes a plurality of pieces, which form the yoke housing, and a fracture portion, which is located along a boundary between the pieces. The fracture portion fractures when a compression force is applied from the outside to break the yoke housing into the pieces.

20 Claims, 6 Drawing Sheets

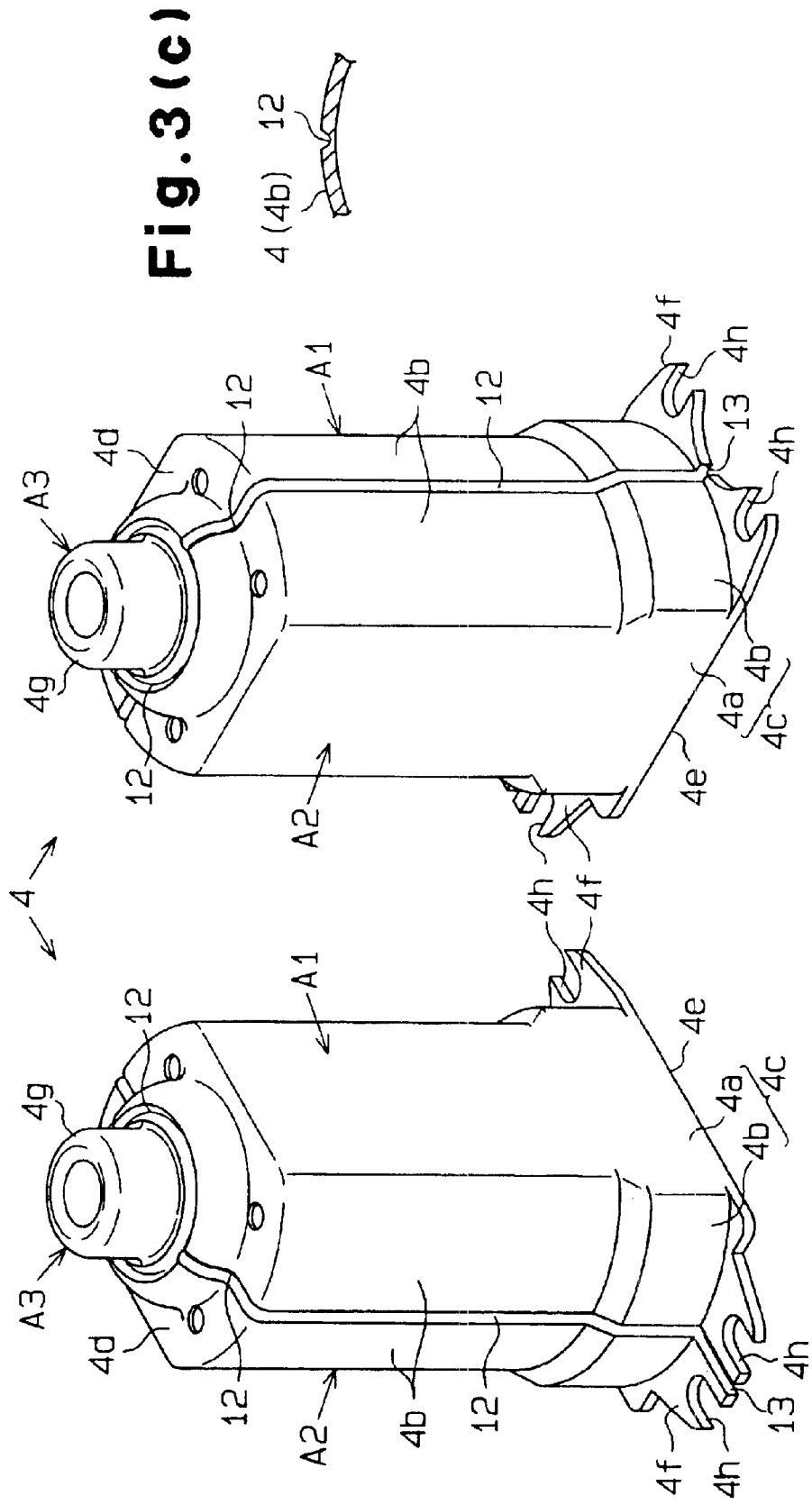

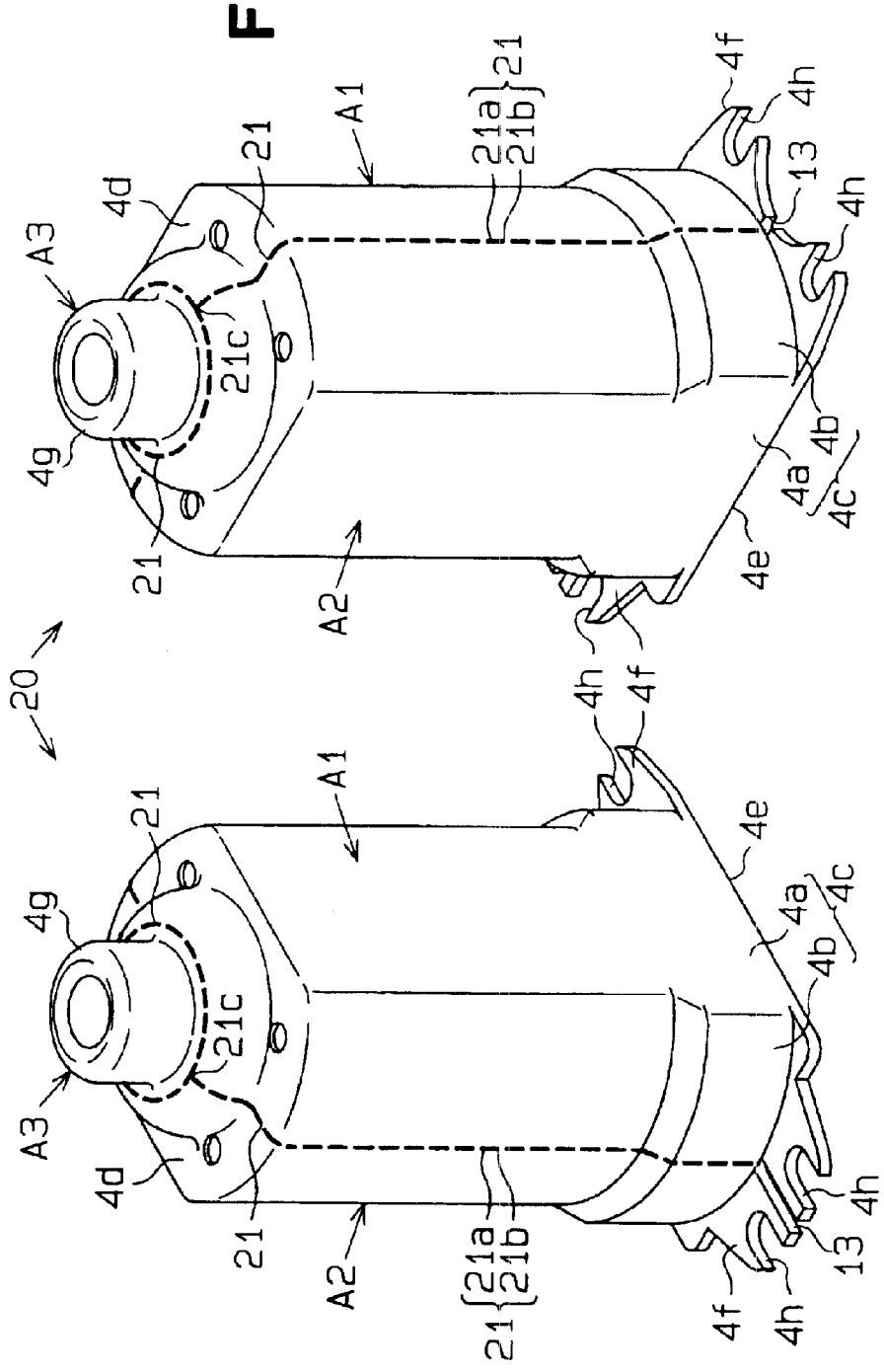

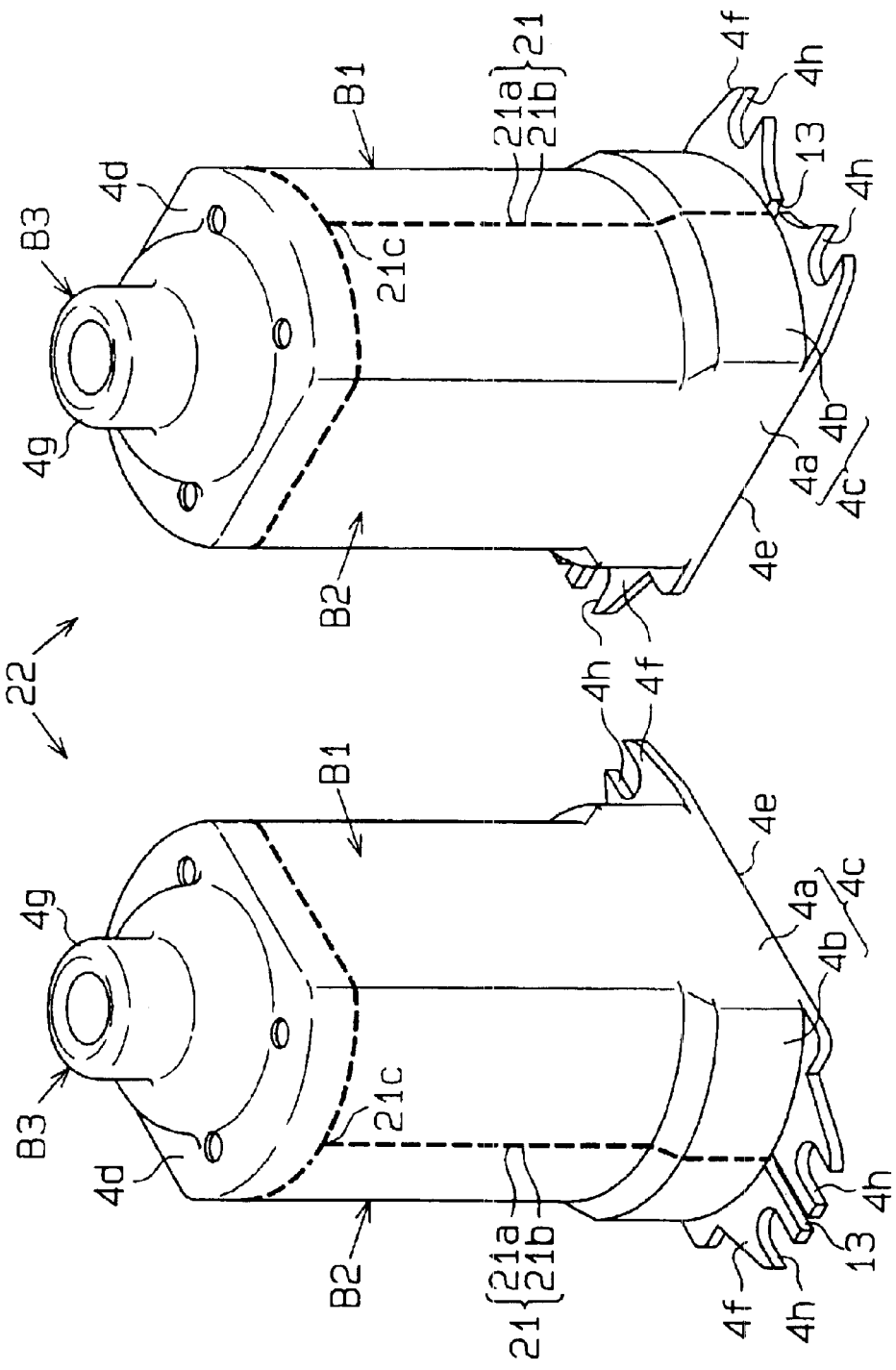

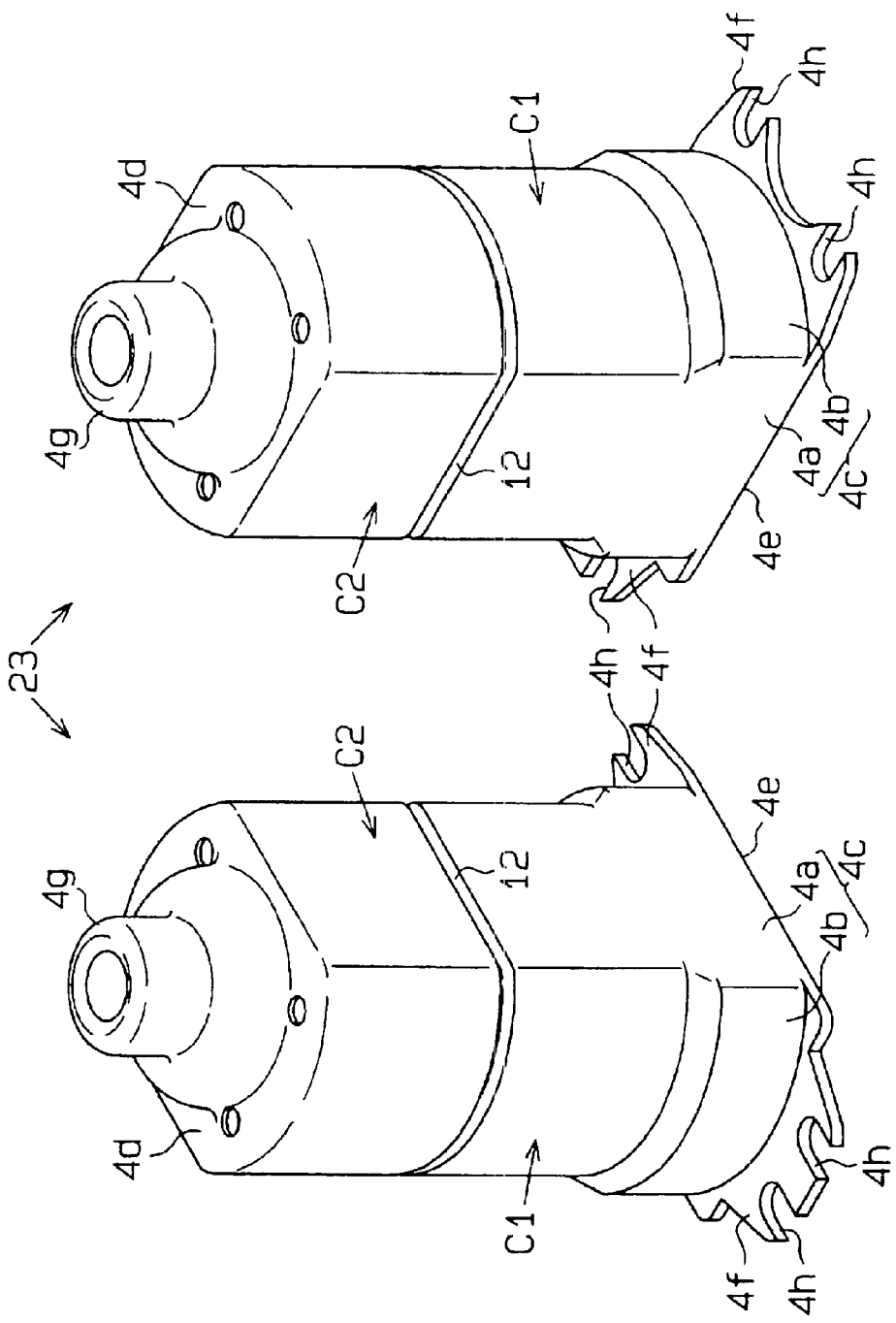

US 6,809,446 B2

YOKE HOUSING AND MOTOR

BACKGROUND OF THE INVENTION

The present invention relates to a yoke housing that is suitable for recycling and a motor that uses the yoke housing.

Recycling of automobile parts is becoming popular these days. Discarded automobiles are cut by a shredder into shredder dust of a predetermined size (for example, 10 cm square) and iron is mainly reused from the shredder dust.

A typical automobile is equipped with many motors. Each motor includes an armature, which has a copper wire (coil). When the armatures are cut by a shredder, copper component is mixed into the shredder dust. As a result, the purity of iron is decreased and the iron could not be reused.

Therefore, in a practical sense, an operator needs to visually check a large amount of shredder dust. When the shredder dust that includes the armature having the copper wire is found, the shredder dust is separated to remove the armature in a different process. After removing the armature, the shredder dust is returned to a recycling process.

When a compression force is applied to a yoke housing of the motor during the recycling process, the yoke housing is broken. If the armature inside the broken yoke housing is visible, the armature is easily removed. However, some of the yoke housings are not broken by the shredder and are simply crushed in such a manner the opening of the yoke housing is closed. In this case, the operator cannot determine whether the armature is accommodated in the yoke housing from the exterior appearance. Thus, the armatures are not easily removed. As a result, the shredder dust including the copper component is passed onto the recycling procedure, which reduces the purity of the iron.

SUMMARY OF THE INVENTION

Accordingly, it is an objective of the present invention to provide a yoke housing that breaks down into several pieces when a compression force is applied from the outside during recycling, and a motor that uses the yoke housing.

To achieve the above objective, the present invention provides a yoke housing, which accommodates an armature having a coil and at least has a tubular circumferential wall. The yoke housing includes a plurality of pieces and a fracture portion. The pieces form the yoke housing. The fracture portion is located along a boundary between the pieces. The fracture portion fractures when a compression force is applied from the outside to break the yoke housing into the pieces.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3(a) and 3(b) are perspective views illustrating a yoke housing of the motor shown in FIG. 1;

FIG. 3(c) is a cross-sectional view illustrating a thin portion of the yoke housing shown in FIG. 3(a);

FIGS. 4(a) and 4(b) are perspective views illustrating a yoke housing according to a second embodiment of the present invention;

FIG. 4(c) is a cross-sectional view illustrating a dashed portion on the yoke housing;

FIGS. 5(a) and 5(b) are perspective views illustrating a yoke housing according to a third embodiment of the present invention; and FIGS. 6(a) and 6(b) are perspective views illustrating a yoke housing according to a fourth embodiment of the present invention.

DETAILED DESCRIPTION OF THE PREFERRED EMBODIMENTS

A first embodiment of the present invention will now be described with reference to FIGS. 1 to 3(c).

Figure 1:
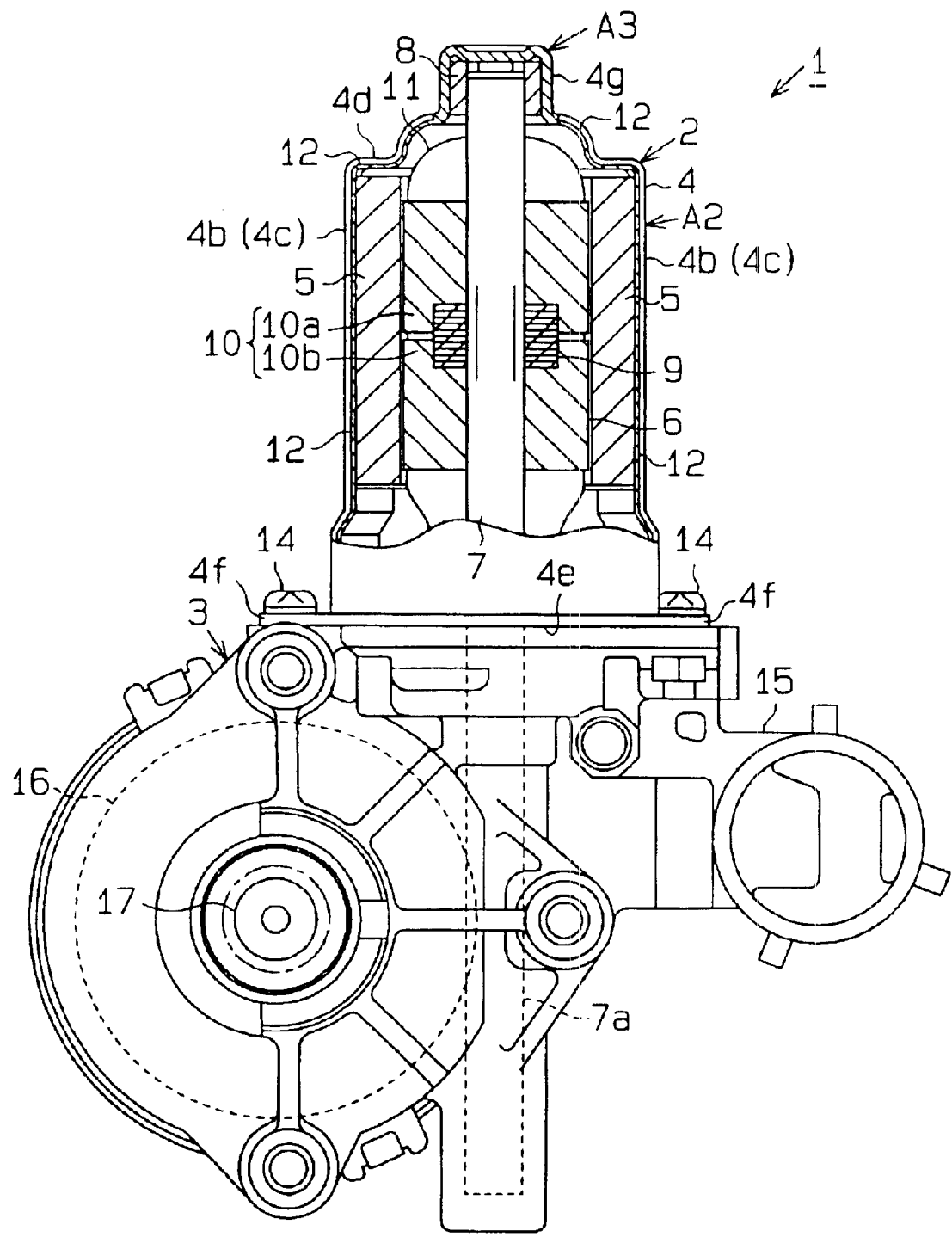
FIG. 1 is a cross-sectional view illustrating a motor according to a first embodiment of the present invention.

As shown in FIG. 1, a motor 1 of the first embodiment includes a main body 2 and a reduction gear 3, which are integrally formed with each other.

Figure 2A:
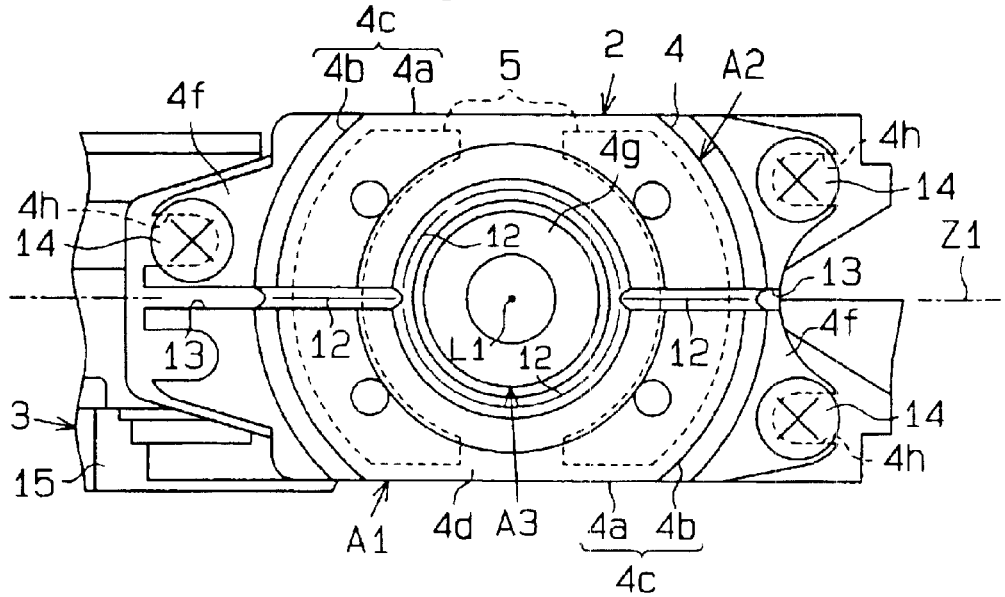
FIG. 2(a) is a plan view of a main body of the motor shown in FIG. 1.
Figure 2B:
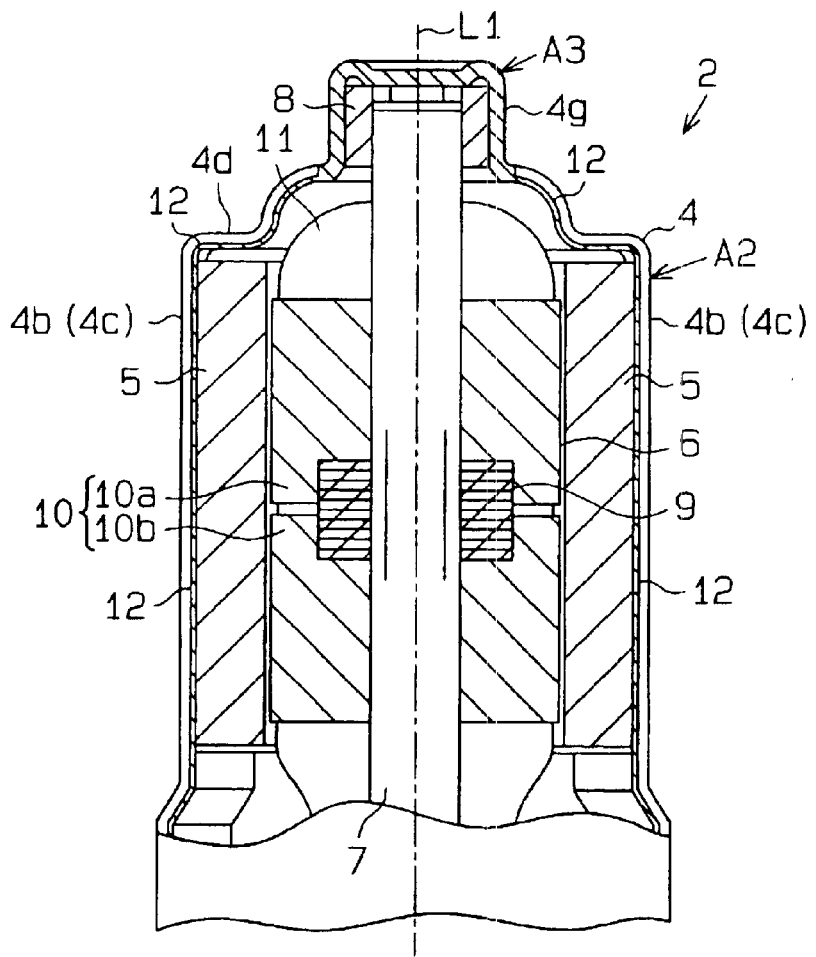
FIG. 2(b) is a cross-sectional view illustrating the main body of the motor shown in FIG. 1.

As shown in FIGS. 2(a) and 2(b), the main body 2 includes a reverse cup-shaped flat yoke housing 4 made by pressing a magnetic metal plate. The yoke housing 4 includes a circumferential wall 4c, a lid 4d, and flanges 4f. The circumferential wall 4c includes a pair of flat walls 4a, which are parallel to each other, and a pair of arcuate portions 4b. Each arcuate portion 4b connects one end of each flat wall 4a with the corresponding end of the other flat wall 4a. The lid 4d closes one end of the circumferential wall 4c. An opening 4e is located opposite to the lid 4d (see FIG. 1). Each flange 4f extends radially outward from the outer circumferential surface of one of the arcuate portions 4b at the opening 4e. A magnet 5 is secured to the inner circumferential surface of each arcuate portion 4b. An armature 6 is rotatably accommodated inside the magnets 5. A reverse cup-shaped bearing retainer 4g is formed at the center of the lid 4d. A bearing 8 is secured to the bearing retainer 4g and rotatably supports a rotary shaft 7 of the armature 6. Through holes 4h (two in this embodiment) are formed at predetermined positions of each flange 4f. The through holes 4h are open radially outward (see FIG. 2(a)).

The armature 6 includes the rotary shaft 7, a coupling member 9, a core 10, and a coil 11. The core 10 includes first and second core portions 10a, 10b, which are equally divided in the axial direction. The core portions 10a, 10b are formed by sintering (molding) soft magnetic metal powder. The core portions 10a, 10b are secured to the rotary shaft 7. The coupling member 9 is located between the core portions 10a, 10b and the rotary shaft 7. The coupling member 9 improves the fixing force of the core 10. A copper wire, which is the coil 11, is wound about the core 10.

As shown in FIGS. 3(a) to 3(c), the yoke housing 4 includes first, second, and third pieces A1, A2, and A3. A thin portion 12 (fracture portion), which has a U-shaped cross-section, is formed on the outer surface of the yoke housing 4 at the boundaries among the first to third pieces A1 to A3. In other words, a brittle portion is formed on the yoke housing 4. The yoke housing 4 breaks down into the first to third pieces A1 to A3 when a compression force is applied during recycling. In the first embodiment, heat treatment, such as hardening, is performed on the thin portion 12 to harden the thin portion 12. This increases the brittleness of the thin portion 12.

The thin portion 12 extends straight from the opening 4e of the yoke housing 4 toward the lid 4d. The thin portion 12 extends through the circumferential center of each arcuate portion 4b. The thin portion 12 extends toward the center of the lid 4d and branches at the vicinity of the bearing retainer 4g to form an annular portion that surrounds the bearing retainer 4g. That is, the thin portion 12 substantially surrounds the armature 6. The thin portion 12 has edge portions that extend to the edge of the yoke housing 4. Each flange 4f includes a cut-out portion 13, which extends straight from the radially outward distal end of the flange 4f toward the corresponding edge of the thin portion 12 formed on the corresponding arcuate portion 4b in a continuous manner. The thin portion 12 and the cut-out portions 13 are located on an imaginary plane Z1 that includes an axis L1 of the main body 2 (or armature 6). FIG. 2(b) is a cross-sectional view of the main body 2 taken along the imaginary plane Z1.

The first piece A1 corresponds to one side of the circumferential wall 4c and the lid 4d (excluding the bearing retainer 4g) that are divided at the imaginary plane Z1. The second piece A2 corresponds to the other side. The third piece A3 corresponds to the bearing retainer 4g. As described above, the yoke housing 4 of the first embodiment is fractured at the thin portion 12 formed on the yoke housing 4 when a compression force is applied from the outside during recycling. The yoke housing 4 is then broken down into three pieces A1 to A3 that are relatively large.

Each magnet 5 is secured to the inner circumferential surface of one of the arcuate portions 4b. Thus, there is a fear that the magnetic resistance of the thin portion 12 formed on the arcuate portions 4b increases. However, since the thin portion 12 is located at the circumferential center of each arcuate portion 4b, or the circumferential center of the rear surface of each magnet 5 (see FIG. 2(a)), the magnetic resistance in the magnetic circuit of each magnet 5 does not increase. That is, the line of magnetic force of each magnet 5 branches at the circumferential center of the rear of the magnet 5 and returns to the circumferential center of the rear of the other magnet 5. Therefore, the line of magnetic force of each magnet 5 does not pass through the thin portion 12. Thus, although the thin portion 12 is located on the arcuate portions 46, the effect on the magnetic field of the magnets 5 is very small. As described above, the yoke housing 4 is formed such that the effect on the output of the main body 2 is minimized.

The yoke housing 4 is secured to a gear housing 15 of the reduction gear 3 by inserting tightening members, which are screws 14 in this embodiment, into the through holes 4h of the flanges 4f while the armature 6 is housed in the yoke housing 4.

As shown in FIG. 1, the gear housing 15 is molded into a predetermined shape from resin material. The rotary shaft 7 projects inside the gear housing 15. A worm 7a is formed at a predetermined portion of the rotary shaft 7. Instead of the worm 7a, a worm shaft on which a worm is formed may be coupled to the rotary shaft 7 to rotate integrally with the rotary shaft 7.

The worm 7a is engaged with a worm wheel 16, which is rotatably accommodated in the gear housing 15. The worm wheel 16 is coupled to an output shaft 17 to integrally rotate with the output shaft 17. Therefore, when the rotary shaft 7 is rotated, the rotation of the rotary shaft 7 is reduced by the worm 7a and the worm wheel 16, and is then transmitted to the output shaft 17.

The gear housing 15 breaks first when a compression force of the shredder is applied to the motor 1 during recycling. In this case, since the through holes 4h of the yoke housing 4 are open radially outward, the flanges 4f easily come off the screws 14 when the yoke housing 4 is deformed by the compression force. Thus, the reduction gear 3 and the main body 2 are easily separated.

When the compression force is further applied to the main body 2 (the yoke housing 4), the thin portion 12, which has low rigidity, is fractured. Since the heat treatment to increase the brittleness is performed, the thin portion 12 is easily fractured. The fracture of the thin portion 12 breaks down the yoke housing 4 into the first to third pieces A1 to A3. Therefore, the armature 6 accommodated in the yoke housing 4 is easily exposed. This improves the visibility of the armature 6 from the exterior appearance. As a result, the armature 6, which has the coil 11, is easily separated from the metal material such as the yoke housing 4.

The first embodiment provides the following advantages.

The yoke housing 4 includes the thin portion 12, which is located along the boundaries of the first to third pieces A1 to A3 such that the yoke housing 4 breaks down into the first to third pieces A1 to A3 when the compression force is applied from the outside. When the compression force is applied to the yoke housing 4 from the outside during recycling, the thin portion 12 is fractured by the compression force. Therefore, the yoke housing 4 breaks down into the first to third pieces A1 to A3. As a result, the armature 6, which is accommodated in the yoke housing 4, is easily exposed. This permits the operator to easily find and remove the armature 6 from the yoke housing 4.

The thin portion 12 extends from the opening 4e and returns to the opening 4e via the lid 4d such that the thin portion 12 substantially surrounds the armature 6. The thin portion 12 permits the yoke housing 4 to break down into relatively large first to third pieces A1 to A3. Thus, the armature 6 is reliably exposed from the yoke housing 4.

The thin portion 12 has the annular portion that surrounds the bearing retainer 4g at the lid 4d. Therefore, the third piece A3, which includes the bearing retainer 4g, is separated from the first and second pieces A1 and A2. Thus, although the bearing 8 that includes a copper component is used, the bearing 8 is easily removed during recycling.

The thin portion 12 is located along the circumferential center of each magnet 5, which is secured to the inner circumferential surface of the circumferential wall 4c. The line of magnetic force generated by each magnet 5 hardly passes through the circumferential center of the magnet 5. Therefore, although the magnetic resistance at the thin portion 12 increases, little effect is applied to the magnetic field of the magnets 5. As a result, the effect on the output of the main body 2 is significantly reduced.

The thin portion 12 is formed along the imaginary flat plane Z1 at portions of the circumferential wall 4c (the arcuate portions 4b) and the lid 4d. Therefore, the thin portion 12 is easily formed.

Since no hole is made in the yoke housing 4, foreign objects, such as water and dust, do not enter the yoke housing 4. Further, since the thin portion 12 is hardened to become brittle, the thin portion 12 is easily fractured.

Since the cut-out portions 13 are continuously formed at the ends of the thin portion 12, the thin portion 12 is easily fractured.

The through holes 4h of the flanges 4f of the yoke housing 4 are open radially outward. Therefore, each screw 14 falls off from the opening of the corresponding through hole 4h, which permits the flanges 4f to easily come off the screws 14. Therefore, the main body 2 and the reduction gear 3 are easily separated.

Since the core 10 is molded from the magnetic metal powder, the core 10 is easily broken by external force. Therefore, the core 10 and the coil 11 of the armature 6 are easily separated.

A second embodiment of the present invention will now be described with reference to FIGS. 4(a) to 4(c). Like or the same reference numerals are given to those components that are like or the same as the corresponding components of the first embodiment of FIGS. 1 to 3(c) and detailed explanations are omitted.

As shown in FIGS. 4(a) and 4(b), a yoke housing 20 of the second embodiment includes a dashed portion 21, which serves as the fracture portion, instead of the thin portion 12. The dashed portion 21 includes first open portions 21a, which are formed through the yoke housing 4, and closed portions 21b. The first open portions 21a and the closed portions 21b are arranged alternately. In other words, the dashed portion 21 is formed of a perforation that extends between the adjacent first and second pieces A1 and A2. The dashed portion 21 includes T-shaped through holes, which are second open portions 21c in the second embodiment, at the branch points in the vicinity of the bearing retainer 4g. In other words, the perforation branches into branch lines at the branch point. The perforation has the second open portion 21c at each branch point. The through hole extends toward all directions that the branch lines extend from the branch point. The yoke housing 20 of the second embodiment also breaks down into relatively large three pieces A1 to A3 by the fracture of the dashed portion 21, which is formed on the yoke housing 20, when the compression force is applied from the outside during recycling.

Since the yoke housing 20 breaks down into relatively large first to third pieces A1 to A3 during recycling in the same manner as the first embodiment of FIGS. 1 to 3(c), the armature 6 mounted inside the yoke housing 20 is easily exposed outside. Therefore, the operator can easily check the armature 6 from the exterior appearance. As a result, the armature 6, which has the coil 11, is easily removed.

The yoke housing 20 has the same advantages as the first embodiment of FIGS. 1 to 3(c) in regard to the structures that are the same as the first embodiment.

The dashed portion 21, which facilitates the fracture of the yoke housing 20, is easily formed and fractures easily.

The dashed portion 21 has the second open portions 21c at the branch portions. Therefore, the branch portions are also easily fractured.

A third embodiment of the present invention will now be described with reference to FIGS. 5(a) and 5(b). Like or the same reference numerals are given to those components that are like or the same as the corresponding components of the embodiments of FIGS. 1 to 4(c) and detailed explanations are omitted.

As shown in FIGS. 5(a) and 5(b), the dashed portion 21 used in the second embodiment of FIGS. 4(a) to 4(c) is formed in a yoke housing 22. The dashed portion 21 extends straight from the opening 4e of the yoke housing 22 to the vicinity of the lid 4d along the circumferential center of each arcuate portion 4b. As in the above embodiments, the dashed portion 21 extends along the imaginary plane Z1 that includes the axis L1 of the main body 2 (armature 6). The dashed portion 21 branches at a point of each arcuate portion 4b close to the lid 4d and extends in a circular manner along an imaginary plane that is perpendicular to the axis L1. In this case, since the dashed portion 21 is formed along the imaginary plane Z1 that includes the axis L1 and the imaginary plane that is perpendicular to the axis L1, the dashed portion 21 is easily formed. The dashed portion 21 substantially surrounds the armature 6.

The yoke housing 22 is divided into first to third pieces B1 to B3 by the dashed portion 21. The first piece B1 corresponds to one side of the circumferential wall 4c divided by the imaginary plane Z1, which includes the axis L1. The second piece B2 corresponds to the other side of the circumferential wall 4c. The third piece B3 includes the lid 4d, which has the bearing retainer 4g, and a portion of the circumferential wall 4c close to the lid 4d. The yoke housing 22 is fractured at the dashed portion 21 formed on the yoke housing 22 when the compression force is applied from the outside during recycling. The yoke housing 22 then breaks down into relatively large pieces B1 to B3.

Since the yoke housing 22 breaks down into relatively large pieces B1 to B3 during recycling in the same manner as the above embodiments, the armature 6, which is mounted inside the yoke housing 22, is easily exposed outside. Therefore, the operator can easily check the armature 6 from the exterior appearance. As a result, the armature 6, which has the coil 11, is easily removed.

The yoke housing 22 has the same advantages as the above embodiments in regard to the structures that are the same as the above embodiments.

A fourth embodiment of the present invention will now be described with reference to FIGS. 6(a) and 6(b). Like or the same reference numerals are given to those components that are like or the same as the corresponding components of the embodiments of FIGS. 1 to 5(b) and detailed explanations are omitted.

As shown in FIGS. 6(a) and 6(b), a yoke housing 23 includes the thin portion 12 of the first embodiment shown in FIGS. 1 to 3(c). The thin portion 12 is located at substantially the axial center of the yoke housing 23 and extends in a circular manner along an imaginary plane that is perpendicular to the axis L1 of the main body 2 (armature 6). Since the thin portion 12 is formed along the imaginary plane that is perpendicular to the axis L1, the thin portion 12 is easily formed. The thin portion 12 substantially surrounds the armature 6.

The yoke housing 23 is divided into first and second pieces C1 and C2 by the thin portion 12. The first piece C1 corresponds to one side of the circumferential wall 4c divided by the imaginary plane that is perpendicular to the axis L1. The second piece C2 corresponds to the other side of the circumferential wall 4c. The yoke housing 23 is fractured at the thin portion 12 formed on the yoke housing 23 when the compression force is applied from the outside during recycling. The yoke housing 23 then breaks down into relatively large pieces C1 and C2.

As in the above embodiments, since the yoke housing 23 breaks down into relatively large pieces C1 and C2 during recycling, the armature 6 inside the yoke housing 23 is easily exposed outside. Therefore, the operator can easily check the armature 6 from the exterior appearance. As a result, the armature 6, which has the coil 11, is easily removed.

It should be apparent to those skilled in the art that the present invention may be embodied in many other specific forms without departing from the spirit or scope of the invention. Particularly, it should be understood that the invention may be embodied in the following forms.

The thin portion 12 according to the first embodiment of FIGS. 1 to 3(c) and the fourth embodiment of FIGS. 6(a) and 6(b) is hardened to further increase the brittleness. However, the thin portion 12 need not be hardened, or the thin portion 12 may be omitted and only the hardening may be performed. The thin portion 12 may also be combined with the dashed portion 21 of the second and third embodiments shown in FIGS. 4(a) to 5(b). The position of the thin portion 12 and the dashed portion 21 may be varied as required.

The yoke housings 4, 20, 22, and 23 of the embodiments of FIGS. 1 to 6(b) are reverse cup-shaped and flat. However, the yoke housings 4, 20, 22, and 23 may be cylindrical. Also, the yoke housings 4, 20, 22, and 23 may simply be tubular and other member may be attached as the lid 4d.

The structure of the yoke housing 4, 20, 22, and 23 of the above embodiments shown in FIGS. 1 to 6(b) may be changed in other form as required.

In the above embodiments shown in FIGS. 1 to 6(b), the core 10 is formed by sintering (molding) magnetic metal powder. However, a laminated core, in which core sheets made of magnetic metal plate are piled in layers, may be used.

The structure of the motor 1 may be changed in other form as required. For example, the reduction gear 3, which includes the worm wheel 16, is used in the above embodiments. However, a reduction gear having other reduction mechanism may be used. The present invention may also be embodied in a motor that is not integrally formed with a reduction gear.

Therefore, the present examples and embodiments are to be considered as illustrative and not restrictive and the invention is not to be limited to the details given herein, but may be modified within the scope and equivalence of the appended claims.

What is claimed is:

1. A yoke housing, which accommodates an armature having a coil, wherein the yoke housing at least has a tubular circumferential wall, the yoke housing comprising:
    a plurality of pieces, which form the yoke housing; and
    a fracture portion located along a boundary between the pieces, wherein the fracture portion fractures when a compression force is applied from the outside to break the yoke housing into the pieces, and wherein part of the fracture portion is more brittle than part of the pieces.

2. The yoke housing according to claim 1, wherein the circumferential wall has a closed end, which is closed by a lid, and an open end, and wherein the fracture portion extends from the open end and returns to the open end via the lid or a portion close to the closed end of the circumferential wall.

3. A yoke housing, which accommodates an armature having a coil, wherein the yoke housing at least has a tubular circumferential wall, the yoke housing comprising:
    a plurality of pieces, which form the yoke housing; and
    a fracture portion located along a boundary between the pieces, wherein the fracture portion fractures when a compression force is applied from the outside to break the yoke housing into the pieces;
    wherein the circumferential wall has a pair of flat walls, which are parallel to each other, and a pair of arcuate portions, which face each other.

4. The yoke housing according to claim 3, wherein the fracture portion includes a portion that extends on the arcuate portions and is parallel to the axis of the circumferential wall.

5. The yoke housing according to claim 2, wherein the lid has a bearing retainer, which is located inside the yoke housing and retains a bearing, and wherein the fracture portion includes an annular portion, which surrounds the bearing retainer at the lid or a portion close to the closed end of the circumferential wall.

6. The yoke housing according to claim 1, wherein a magnet is attached to the inner circumferential surface of the circumferential wall, and wherein the fracture portion extends in the axial direction of the circumferential wall along a portion of the circumferential wall that corresponds to the circumferential center of the magnet.

7. The yoke housing according to claim 1, wherein the fracture portion includes a portion that extends along an imaginary plane that includes the axis of the armature.

8. The yoke housing according to claim 1, wherein the fracture portion extends on the yoke housing such that the yoke housing breaks into at least two pieces along an imaginary plane that includes the axis of the circumferential wall.

9. The yoke housing according to claim 1, wherein the fracture portion includes a portion that extends in a circular manner along an imaginary plane that is perpendicular to the axis of the armature.

10. The yoke housing according to claim 1, wherein part of the fracture portion is thinner than part of the pieces.

11. The yoke housing according to claim 1, wherein the fracture portion is formed of a perforation that extends between the adjacent pieces.

12. The yoke housing according to claim 11, wherein the perforation branches into a plurality of branch lines at a branch point, wherein the perforation has a through hole at the branch point, and wherein the through hole extends from the branch point in all the directions in which the branch lines extend.

13. The yoke housing according to claim 1, wherein the fracture portion has an edge portion, which extends to the edge of the yoke housing, and wherein the yoke housing has a cut-out portion, which is continuous with the edge portion of the fracture portion at the edge of the yoke housing.

14. A motor comprising;
    an armature, wherein the armature has a coil; and
    a yoke housing, which accommodates the armature, wherein the yoke housing at least has a tubular circumferential wall, and wherein the yoke housing includes:
        a plurality of pieces, which form the yoke housing;
        a fracture portion located along a boundary between the pieces, wherein the fracture portion fractures when a compression force is applied from the outside to break the yoke housing into the pieces, and wherein part of the fracture portion is more brittle than part of the pieces.

15. A motor comprising:
    an armature, wherein the armature has a coil;
    a yoke housing, which accommodates the armature, wherein the yoke housing at least has a tubular circumferential wall, and wherein the yoke housing includes:
        a plurality of pieces, which form the yoke housing;
        a fracture portion located along a boundary between the pieces, wherein the fracture portion fractures when a compression force is applied from the outside to break the yoke housing into the pieces; and
    a reduction gear mounted to the yoke housing, wherein the reduction gear reduces the rotational speed of the armature.

16. The motor according to claim 15, wherein the yoke housing has a flange, which is secured to the reduction gear with a tightening member, wherein the flange has a through hole, which is open radially outward, and wherein the tightening member passes through the through hole.

17. The motor according to claim 14, wherein the armature has a core to which a coil is wound, and wherein the core is molded from magnetic metal powder.

18. A yoke housing, which accommodates an armature having a coil, wherein the yoke housing at least has a tubular circumferential wall, the yoke housing comprising:

a plurality of pieces, which form the yoke housing; and a brittle portion located along a boundary between the pieces, wherein the brittle portion is more brittle than the pieces.

19. The yoke housing according to claim 1, wherein heat treatment is performed on the fracture portion.

20. The motor according to claim 14, wherein heat treatment is performed on the fracture portion.

* * * * *